May 7, 1946.   H. KLINZMANN, SR., ET AL   2,399,642
UTILITY HAND CART
Filed Aug. 14, 1944
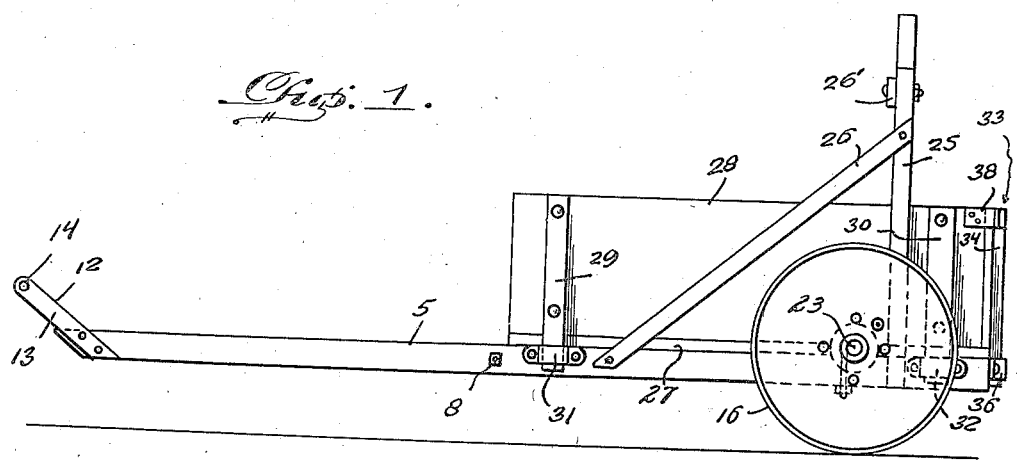
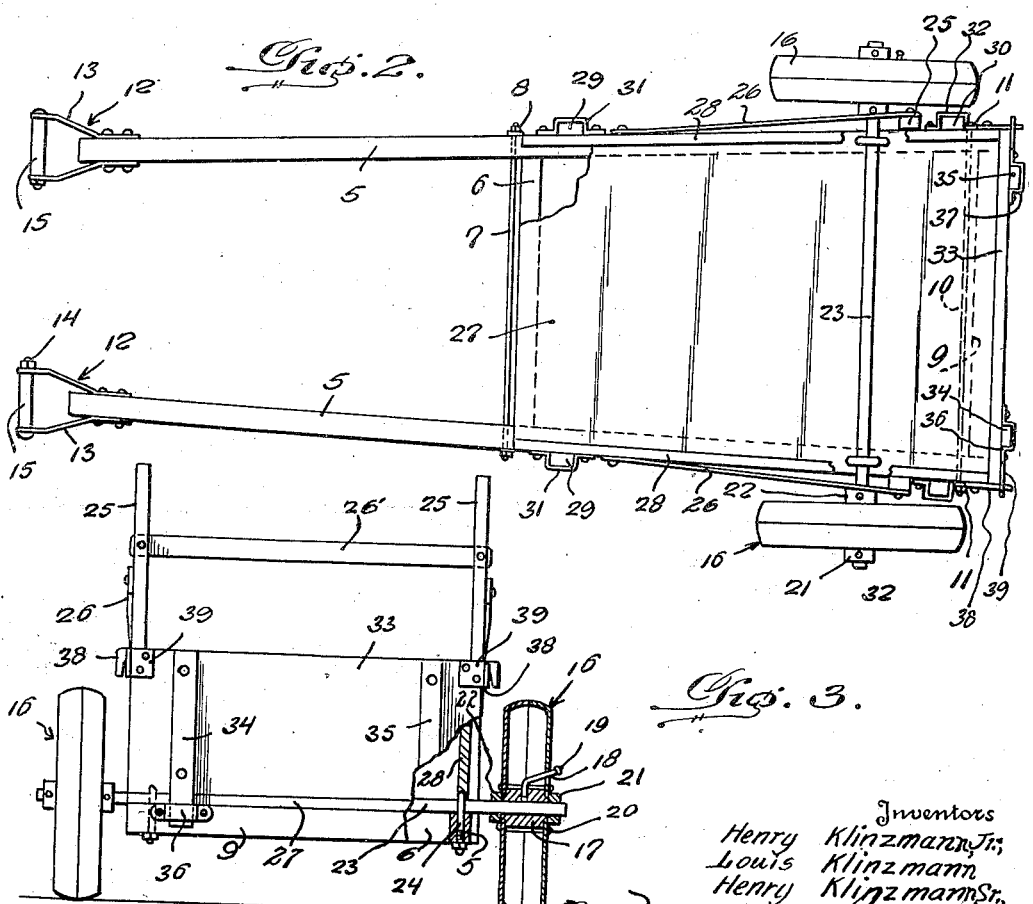

Patented May 7, 1946

2,399,642

UNITED STATES PATENT OFFICE 2,399,642

UTILITY HAND CART

Henry Klinzmann, Sr., Henry Klinzmann, Jr., and Louis Klinzmann, Haigler, Nebr.

Application August 14, 1944, Serial No. 549,346

3 Claims. (Cl. 280—51)

The invention relates to an improved general untility hand cart, especially though not necessarily for use to facilitate farm chores, such as stock feeding and transporting and other light hauling, and the primary object of our invention is to provide a simple and inexpensive cart of this type which is structurally and mechanically sound and is readily adaptable to a multiplicity of uses.

Another important object of the invention is to provide a cart of this type which can readily be handled and either pulled or pushed by hand by one or more workers and which does not subject them to awkward and tedious effort, even when the cart is moved by them over uneven and rough ground.

The above and other important objects of our invention will appear from the following description and the appended drawing in which a preferred embodiment of the invention is described and shown only for illustration.

In the drawing:

Figure 1 is a side elevation of the cart.

Figure 2 is a top plan thereof;

Figure 3 is a right hand end elevation of the cart partly in section to show details of construction.

Referring in detail to the drawing, in the cart chosen to illustrate the invention, the frame consists of a pair of longitudinal horizontal frame side members 5 which are spaced and braced apart by an intermediate cross member 6, at the left hand side of which the frame side members are pierced by a rod 7 having nuts 8 threaded on its outer ends to clamp the side members against the ends of the cross member 6.

A second cross member 9 is arranged and secured between the right hand ends of the frame side members, and another rod 10 like the rod 7 passes through the side members 5 and clamps them against the ends of the member 9 by means of nuts 11. The cross member 9 is somewhat longer than the intermediate cross member 6, so that the frame side members converge toward the left to a convenient spacing of the ends thereof to enable a worker to grasp both handles 12 thereon while walking between the left ends of the side members 5 when facing forward and pulling the cart or when positioned in front of the handles and pushing the cart.

The handles 12 are of a comfortable shovel handle type, being formed of flat diverging irons 13 secured to opposite sides of the members 5 and traversed by a bolt 14 arranged horizontally and holding thereon a hollow handgrip 15 between the wide ends of the irons. The irons and the adjacent ends of the members 5 are upwardly angulated as shown in Figure 1 to a comfortable and efficient level. With this type of handle one man walking between or in front of the side members can easily either pull or push the cart and maneuver the same with one or both hands over smooth or rough ground, and one or more additional men can assist therein.

Being essentially a low-lying, low center of gravity cart, the frame is mounted on relatively small wheels 16, which may be of the hollow type shown, if desired, having hubs 17 penetrated by a greasing tube 18 having a grease fitting 19 at its outer end projecting through one of the wheel sections which are bolted together as indicated at 20.

The wheels 16 are mounted between collars 21 and 22 on a stationary axle 23 which is mounted transversely across the tops of the frame side members 5 by U-bolts 24 passing through the side members, the side members being thereby underslung below the axle, and the axle being located close to the right hand end of the frame at a point providing for easy handling of the cart when loaded.

The frame of the cart is completed by standards 25 secured at their lower ends to the outside of the side members 5 at the right hand side of the axle 23 and braced by irons 26 secured to the standards and the side members at their upper and lower ends, respectively, as shown in Figure 1. A cross brace 26' is bolted to and across the upper part of the standards on the left hand side thereof.

A bottom plate 27 is secured on the tops of the frame side members, and sideboards 28 having spaced vertical cleats 29 and 30 engaging in holders 31 and 32 on the outer sides of the side members, removably rest upon the bottom 27.

A rear board 33 has vertical cleats 34 and 35 removably engaging in holders 36 and 37 on the rear cross member 9 and when in place abuts the adjacent edges of the sideboards 28. The sideboards have slotted side irons 38 secured thereon to be engaged by slotted end irons 39 on the rear board 33, this arrangement increasing the mutual bracing of the sideboards and end board relation to each other and the frame. The sideboards when in place rest against the standards 25.

What is claimed is:

1. A general utility hand cart of the type described comprising, in combination, a low-hung frame comprising a pair of laterally spaced-apart substantially horizontal elongated frame side members, transverse means connecting and securely holding said side members in their laterally spaced-apart relation and leaving substantial lengths of the forward portions of the side members free and unencumbered to define walk-between handle members, supporting ground wheels of comparatively small diameter, located adjacent to the opposite ends of the side members, a receptacle body mounted on the frame in substantially balanced contiguity to said ground wheels, and shovel-type hand-grasp members secured to and extending at an upward inclination from said handle members, whereby the operator of the cart may pull the cart from a position between the handle members or push the cart from a position in front of the ends of the handle members.

2. A general utility hand cart in the correlated and cooperative combination of elements as set forth in claim 1, wherein the frame of the cart includes braced upright standards thereon and rising outside of the side wall members of the receptacle body in lateral supporting relation to said wall members.

3. A general utility hand cart in the correlated and coordinated elements in the combination as set forth in claim 1 wherein the bottom of the receptacle body is secured directly to the frame of the cart but the side and end wall members of the body are detachably mounted marginally on the bottom of the body and detachably secured together at the meeting upper corner portions thereof, and the longitudinal side members of the cart frame being provided with upright standards on said side members of the cart frame adjacent the body supporting end portions of said side members, said uprights rising outside of the side wall members of the receptacle body in lateral supporting relation to said wall members and being braced by inclined brace members secured at their upper ends to the respective uprights and at their lower ends to the respective side members of the cart frame.

HENRY KLINZMANN, Sr.
HENRY KLINZMANN, Jr.
LOUIS KLINZMANN.